Figure 1:
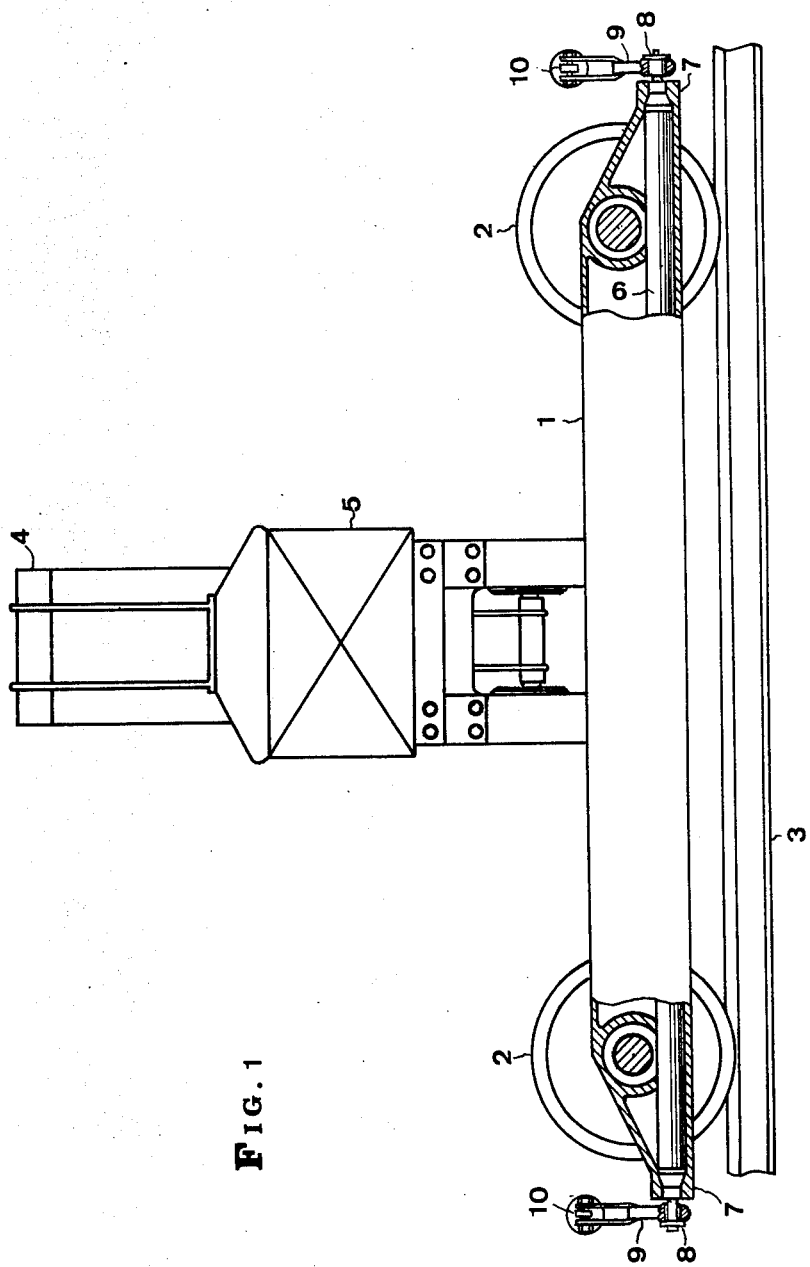

United States Patent [19]

Fagel

[11] 3,961,583

[45] June 8, 1976

[54] STABILIZED ARTICULATED CAR

[75] Inventor: Roger Fagel, Marcinelle, Belgium

[73] Assignee: Ateliers de Constructions Electriques de Charlerol (ACEC), Charleroi, Belgium

[22] Filed: June 7, 1974

[21] Appl. No.: 477,289

[30] Foreign Application Priority Data

| June 19, 1973 | Belgium | 5177 |
| Feb. 8, 1974 | Belgium | 5699 |

[52] U.S. Cl. ............................. 105/4 R; 105/168; 105/199 A
[51] Int. Cl.² ...................... B61F 3/08; B61F 3/12; B61F 5/24; B61F 5/52
[58] Field of Search......... 105/4 R, 4 A, 168, 199 A

[56] References Cited
UNITED STATES PATENTS

| 1,728,096 | 9/1929 | Algrain | 105/168 X |
| 2,217,034 | 10/1940 | Van Dorn | 105/4 R |
| 2,252,789 | 8/1941 | Van Dorn | 105/4 R |
| 2,746,399 | 5/1956 | Tomas | 105/4 R |
| 2,863,401 | 12/1958 | Furrer | 105/4 R |

FOREIGN PATENTS OR APPLICATIONS 1,543,529  9/1968  France ........................ 105/4 R Primary Examiner—Robert J. Spar
Assistant Examiner—Howard Beltran
Attorney, Agent, or Firm—Raymond A. Robic; Peter G. Mack; Arthur Schwartz

[57] ABSTRACT

Stabilizing device for compensating by restraining the relative rocking movements between an articulated railroad car body and bogie running at high speed. The device comprises, longitudinally extending across the frame of the bogie a tube having sufficient stiffness for being free of any torsion, adapted to rotate inside bearings disposed at the extremities of the frame. The tube is provided at its extremities, with two parallel crank-arms integrally connected to the tube. The extremity of each of the crank-arms is articulated to a rigid connecting member which is attached on the other hand, by means of a swivel-joint, to a corresponding car body.

8 Claims, 6 Drawing Figures

STABILIZED ARTICULATED CAR

The present invention realtes to inner-body bogies of a railroad lift of carriages running at high speed.

The invention has for one of its objects to eliminate the rocking movements of the bogie by forcing the bogie to take a position which is imposed by the orientation of the car bodies and not by the track.

The device according to the invention is characterized in that it comprises, extending longitudinally across the frame of the bogie, a tube having a sufficient stiffness in order not to be submitted to torsion, and adapted to rotate in bearings arranged at the extremities of the frame, the tube being provided, at its extremities, with two parallel crank-arms which are integrally connected with the tube, the extremity of each of the crank-arms being articulated to a rigid tie or connecting member attached by its other extremity to the corresponding car body by means of swivel-joint.

According to one embodiment of the invention, the rigid connecting member is constituted by a hydraulic cylinder the piston of which is brought at the end of its course under the action of an appropriate oil pressure, the pressure being automatically released when the speed of the lift of carriages falls under a certain value in order to release the rigid connecting member for permitting movement of the lift of carriages particularly at the entrance of stations where the curve of the track may pass from one direction to the other.

According to the invention, the rigid connecting member is electromagnetic and comprises a cylindrical body closed at one extremity by an electromagnet presenting a plane face directed towards the inside of the cylindrical body in which may slide a piston made of a magnetic material presenting a plane face adapted to be applied on the face of the electromagnet and to be maintained thereon by the magnetic attraction of the electromagnet with an appropriate force when the electromagnet is excited, the piston being provided with a rod extending from the other extremity of the cylindrical body and provided with articulation means for articulation to the crank-arm of the bogie, while the electromagent is provided with connecting means for connection to the corresponding car body supported by the bogie, the piston being submitted to the action of a spring surrounding the rod of the piston inside the cylindrical body on which body the spring rests on the other hand, the spring urging the piston twwards the electromagnet.

The following description and the attached drawings relate to certain embodiments of the invention.

Figure 2:
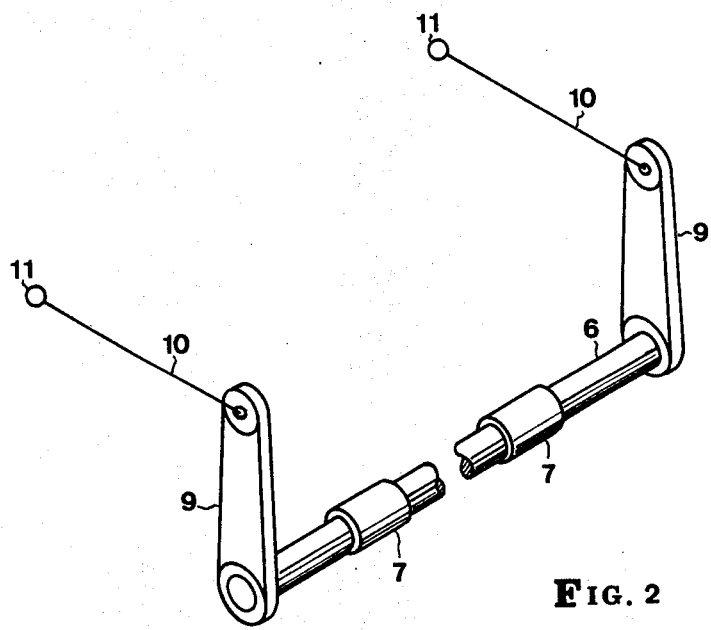
Figure 3:
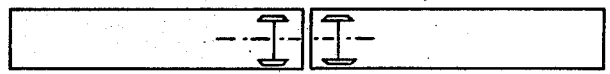
Figure 4:
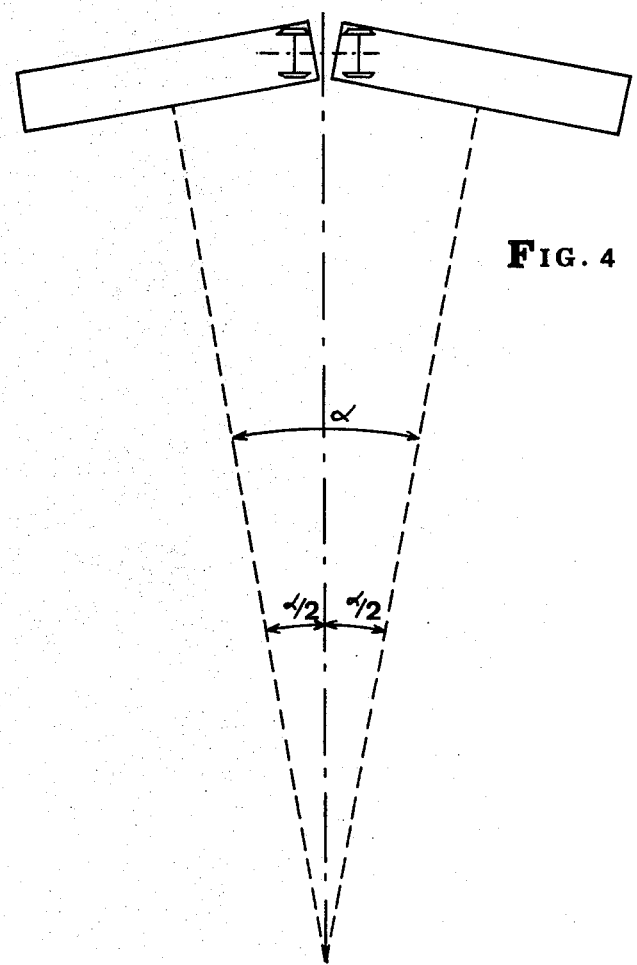
Figure 5:
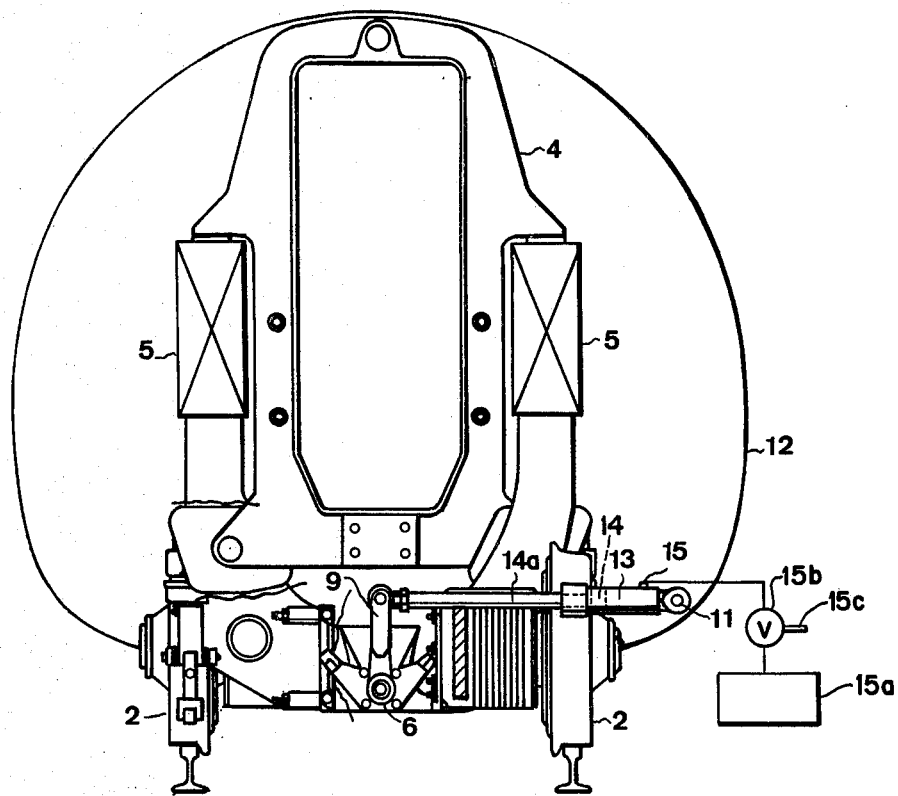
Figure 6:
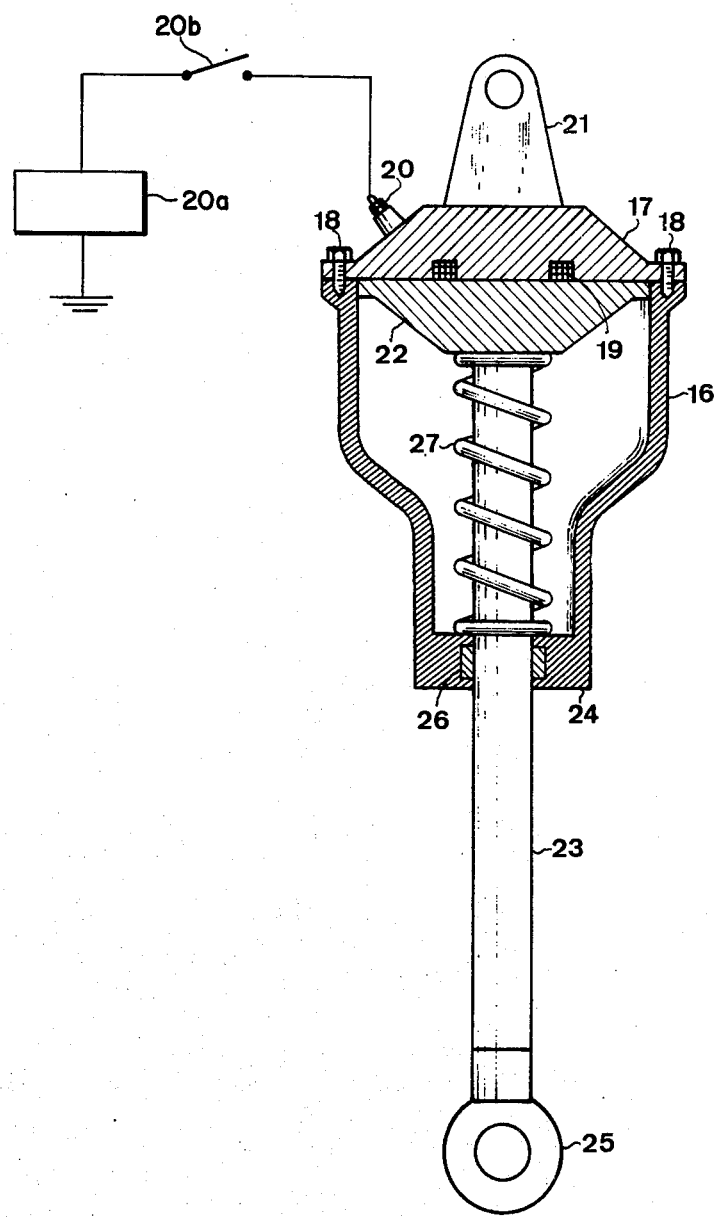

In the drawings:

FIG. 1 shows a longitudinal view, partly in section, of a bogie equipped with a device according to the invention, FIG. 2 shows in a schematic perspective view a detail of one part of the invention, FIG. 3 is a schematic view of two car bodies on two bogies when the car bodies are aligned, FIG. 4 is a schematic view of the car bodies when the lift of carriages is negotiating a curve, FIG. 5 is a transverse view partly in cross-section of the bogie shown in FIG. 1 and showing a car body mounted on the bogie, and FIG. 6 is a view of an electromagnetic element forming part of the device according to the invention.

Referring now to FIG. 1, there is shown a bogie comprising a frame 1 equipped with wheels 2, adapted to roll on a track 3, and a connection system 4 of two adjacent car bodies, not shown, retained by a suspension device 5. A tube 6 transverses from one side to the other the frame of the bogie in a longitudinal direction. The tube may rotate in end bearings 7 and is provided at each of its extremities with a grooved or channelled part 8 engaged in corresponding grooves or channel of a crank-arm 9 articulated at its extremity to a rigid connecting member 10.

FIG. 2 shows in a schematic perspective view the tube 6, the bearings 7, the crank-arms 9 and the rigid connecting members 10 articulated at the extremity of crank-arms 9. The rigid connecting members are attached on the other hand, to two adjacent respective car bodies by means of swivel-joints 11. It is to be noted that the position of tube 6, and therefore of the bogie, depends only on the orientation of the car bodies as shown in FIGS. 3 and 4 which represent respectively the situation where the two car bodies are aligned and the situation where the lift of the carriages is negotiating a curve. In the last situation, the axis of the bogie is perpendicular to the bissection of the angle formed between the radii of the curve which are perpendicular to the car bodies.

FIG. 5 is a transverse view, partly in cross-section, of the bogie of FIG. 1. As shown in FIG. 5, the rigid connecting member between the articulated extremity of crank-arm 9 and the swivel-joint 11 connected to the car body 12 of the vehicle is constituted by a hydraulic cylinder 13 equipped with a piston 14 from which a piston rod 14a extends. Piston 14 is brought to its end of course by means of oil pressure admitted in the cylinder 13 by an inlet 15. The hydraulic cylinder obviously may be fed by any suitable hydraulic arrangement including a pressure source. In this regard, a pressure source 15a is schematically illustrated in FIG. 5. The cylinder 13 is automatically brought to an exhaust condition as soon as the speed of the lift of carriages falls under a certain value, for instance 60 m.p.h. The device for compensating the rocking movements is thus put out of service which permits more free relative movements in of the lift of carriages in certain circumstances which are imposed by the track. Of course, any suitable speed responsive device may be used with the hydraulic system to effect automatic release or activation of the hydraulic pressure. Also the particular apparatus used and the manner of incorporation it into the system is well within the oridinary level of skill in the art. It will also be apparent that a manual device for initiating release or activation of the hydraulic pressure at certain speeds may be used. In this regard, a valve 15b and associated handle 15c for effecting manual initiation of release and activation of the hydraulic pressure are schematically shown in FIG. 5.

In such a hydraulic connection or link, the cylinder of the different bogies must be fed along the entire length of the train, either by means of standard pipes or by a special unique pipe.

According to a further embodiment of the invention, the connection is purely electromagnetic between the bogie and the car body, and thus does not pose hydraulic junction problems and its control is simply made by connecting or cutting from a suitable power source the feeding electric circuit.

FIG. 6 represents an electromagnetic element adapted to form a removable rigid connecting member between a car body of a train running at high speed and the corresponding crank-arm fixed at the extremity of the tube longitudinally extending across the frame of the bogie, as above described, instead of having a hydraulic connecting member as represented in FIG. 5.

The electromagnetic element comprises a cylindrical body 16 closed at one of its extremities by a circular electromagnet 17 fixed to body 16 on its periphery by means of screws 18. The electromagnet 17 presents a plane face, turned towards the inside of the cylindrical body 16 in which is provided a circular groove which contains an excitation winding 19 one extremity of which is connected to an electrical terminal 20, the other extremity being connected to the ground. It is also possible to provide two feeding terminals without using the ground as a second conductor.

Terminal 20 and the homologous terminal of the other element of the bogie are connected, as well as the terminals of the other bogies of the train, to a D.C. (direct current) voltage source 20a, through appropriate conductors and apparatus as shown schematically in FIG. 6. The electromagnet 17 is provided with a connector 21 for its connection to the corresponding box.

Inside the cylindrical body 16 is adapted to slide a piston 22 of magnetic material such as steel, provided with a rod 23 traversing the body 24 of the cylindrical body 16 opposite electro element 17. Rod 23 is provided, at its extremity, with an articulation 25 for its connection to the appropriate crank-arm of the longitudinal tube of the bogie. A sealing ring 26 is disposed in the bore of the bottom 24 of the body 16, from where rod 23 passes. Lubrification means, not represented, are provided for the mechanism.

When electromagnet 17 is excited by feeding its winding 19, piston 22 is applied against it with a sufficient strength for forming a rigid connection between the box and the bogie. In order to optimize the effect of the magnetic circuit of flux produced by the magnetomotor force of the winding 19, the yoke of the electromagnet 17 and the piston 22 are so shaped that in all the sections traversed by the flux a substantially constant induction prevails. In the embodiment shown in FIG. 6, there has been adopted for these parts a general shape of a truncated cone but it is evident that other shapes can also be adopted which respond to the desired result.

A spring 27 surrounding rod 23 rests against bottom 24 inside body 26 and urges piston 22 towards electromagnet 17. When the conditions necessitate the elimination of the rigid connecting member between the car body and the bogie, the feeding or energizing of the winding 19 is cut off and rod 23 is free to move under the action of forces between the car body and the bogie generated by the shaping of the track and with respect to which the action of the spring is negligible. However, when the conditions are such as to permit to the train to run at high speeds, in which case the rigid connecting member between the bogie and the box must be set, spring 27 pushes piston 22 against electromagnet 17 and a relatively small excitation is sufficient for producing the necessary attraction force, which could have not been the case if piston 22 would have been moved by only electromagnet 17 which would have required prohibitive ampere turns for the electromagnet. As with the hydraulic arrangement of FIG. 5, it again will be readily apparent that any suitable speed responsive device may be used with the electromagnetic arrangement of FIG. 6 to effect automatic release or engagement of the rigid connection. Again, too, the particular apparatus used and the manner of incorporating it into the system is well within the ordinary level of skill in the art. As in the case of the hydraulic system, it will again be apparent that a manual device for initiating actuation or deactuation of the electrical excitation at certain speeds may be used. Thus, a switch 206, for effecting such actuation and deactuation is schematically shown in FIG. 6.

It should be noted that the elements which are represented in the figures and which are not numbered, belong to the known art and therefore do not form part of the invention.

Although the invention has been described with a certain degree of particularity, it is understood that the present disclosure has been made only by way of example and that numerous changes in the details of construction and the combination and arrangement of parts may be resorted to without departing from the scope of the invention as hereinafter claimed.

I claim:

1. A device for compensating for the rocking movements between a railroad bogie and articulated railroad car bodies, the ends of which are supported on the bogie, the device comprising:
   a. a bogie having a frame;
   b. a torsionally rigid, elongated member pivotally supported in said bogie by bearings;
   c. first and second crank arms, one end of each crank arm being rigidly and integrally fixed to said elongated member;
   d. first rigid means, coupled to the other end of said first crank arm, for rigidly connecting said first crank arm to one car body;
   e. second rigid means, coupled to the other end of said second crank arm, for rigidly connecting said second crank arm to another car body;
   f. means for selectively releasing said first and second rigid connecting means to allow generally free relative movement between the car bodies and bogie so that said first and second rigid connecting means may be released at lower speeds to facilitate negotiation of relatively tortuous track;
   g. whereby the car bodies may be selectively coupled together at high speeds to restrain their freedom of movement with respect to each other and with respect to the bogie thereby compensating for the usual rocking movements between the bogie and the car bodies.

2. Device according to claim 1, characterized in that said first and second rigid connecting means are constituted by hydraulic cylinders each having a piston which is brought to its end of course under a suitable oil pressure from a pressure source communicating with said hydraulic cylinders.

3. Device according to claim 2, characterized in that means are provided for releasing the oil pressure when the speed of the bogie falls below a certain value in order to release the first and second rigid connecting means.

4. Device according to claim 1, characterized in that said first and second rigid connecting means each comprises a cylindrical body closed at one extremity by an electromagnet presenting a plane face turning towards the inside of the cylindrical body in which is adapted to slide a piston made of a magnetic material, said piston presenting a plane face adapted to be applied on the plane face of the electromagnet and to be maintained thereon by the magnetic attraction of the electromagnet with a suitable force when the electromagnet is excited, said piston being provided with a rod emerging from the other extremity of the cylindrical body and being provided with articulation means for articulation to the crank-arm of the bogie, said electromagnet being provided with a connection element for connection to the corresponding box supported by the bogie, said piston being submitted to the action of a spring surrounding the rod inside the cylindrical body on which body said spring rests on the other hand, said spring urging said piston towards said electromagnet.

5. Device according to claim 4, characterized in that means are provided for cutting the excitation of the electromagnet when the speed of the bogie falls below a certain value in order to disengage the rigid connecting means.

6. Device according to claim 4, including a yoke which carries the electromagnet, said yoke and said piston being shaped in such a way that, in all sections traversed by the magnetic flux, the induction is substantially constant.

7. Device according to claim 6, characterized in that said yoke and said piston are in the general shape of a truncated cone.

8. Device according to claim 4, characterized in that the force of the spring is sufficiently weak to permit substantially free displacement of the piston when the electromagnet is de-energized and to urge the piston back against the electromagnet when it is energized.

* * * * *

UNITED STATES PATENT OFFICE
CERTIFICATE OF CORRECTION

Patent No. 3,961,583　　　　　　　　Dated February 17, 1976

Inventor(s) Roger Fagel

It is certified that error appears in the above-identified patent and that said Letters Patent are hereby corrected as shown below:

Column 1, line 4, "realtes to inner-body" should read --relates to inter-body--;

Column 1, line 45 "tromagent" should read --tromagnet--;

Column 4, line 8, "206" should read --20 b--.

Signed and Sealed this

Nineteenth Day of October 1976

[SEAL]

Attest:

RUTH C. MASON
*Attesting Officer*

C. MARSHALL DANN
*Commissioner of Patents and Trademarks*